Aug. 4, 1970 H. BAUER 3,522,732

SENSING ELEMENT FOR HYGROMETERS

Filed Oct. 19, 1967

INVENTOR
HANS BAUER
BY Burgess, Dinklage + Sprung
ATTORNEYS.

United States Patent Office 3,522,732

Patented Aug. 4, 1970

3,522,732

SENSING ELEMENT FOR HYGROMETERS

Hans Bauer, Lenzkirch, Germany, assignor to Atmos Fritzsching & Co. GmbH, Lenzkirch, Black Forest, Germany, a corporation of Germany Filed Oct. 19, 1967, Ser. No. 676,429
Int. Cl. G01n 25/56, 27/26
U.S. Cl. 73—336.5 11 Claims

ABSTRACT OF THE DISCLOSURE

A hygrometer having a sensing element consisting of a a pitted or rough surfaced substrate, having an electrolyte coated on the walls of the pits on the surface, a capillary containing material on the substrate surface bridging the electrolyte containing-pits, and spaced electrode means on the substrate surface. This hygrometer measures both relative and absolute humidity where a negative temperature coefficient semi-conductor element is connected in series with the electrodes.

Figure 1:
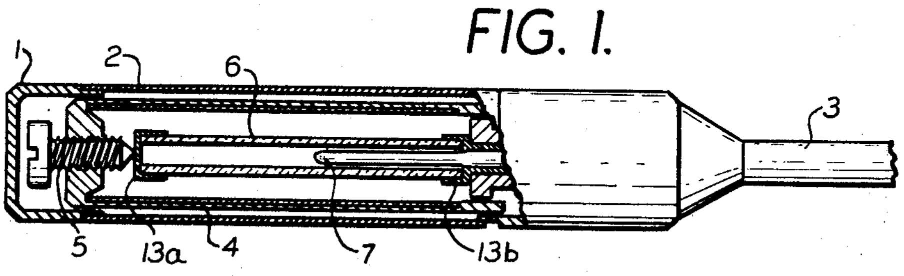

Hygrometers are known devices which are used to measure the moisture content of various materials, particularly gasses. Such devices often operate on a resistance-measuring principle whereby electricity is impressed through a pair, or a multiplicity of pairs, of electrodes and the resistance between the electrodes is measured. With an appropriate electrolyte between the electrodes, the measured resistance is a function of the water content of the electrolyte and, therefore, a function of the water content of the environment being measured. Such electrolytes are hygroscopic materials and are combined with suitable measuring electrodes into a sensing element which is the heart of the hygrometer.

There is, in the prior art, for example, a hygrometer sensing element which is provided with a coating of hygroscopic material based upon a vinyl material coupled with an easily soluble inorganic salt. The water absorption of this device depends reversibly on the relative humidity of the gas surrounding the element. The vinyl material is suitably a polyvinyl alcohol to which an inorganic salt, such as ammonium chloride, has been added.

Also in the state of the art, there are humidity control devices which operate on a lithium chloride basis and have sensing means heated by an alternating current, in which the frequency of the alternating current fed to the lithium chloride sensing means is a multiple of the regular line current. This known apparatus is constructed in the form of a dewpoint meter.

Humidity-indicating apparatus are also known in the art which have a uniform mass of water-insoluble polymeric electrolyte in which ionically active groups are contained in sufficient concentration. This electrolyte has the ability to absorb water easily and thus to cause a physical change in the electrolyte as regards the ratio of the absorbed water to the electrolyte.

Prior-art devices, however, have disadvantages, particularly in that it is difficult to achieve a high time-constant. One of the problems is a stratum displacement, an evaporation of the electrolyte which is promoted by the thin electrolytic film in moving air or heat, and the fact that the hygroscopicity of the electrolyte serves solely for the compensation of the vapor pressure and is varied by continual stratum displacement.

The electrolytic measuring process using lithium chloride and utilizing the hygroscopicity of this substance has a disadvantageous limitation in the lower range, since the ability to absorb water becomes zero below the range of 10% relative humidity.

It is therefore an object of this invention to provide a novel sensing member for use in hygrometers.

It is another object of this invention to provide a novel hygrometer which is capable of accurately measuring relative humidity in the 2 to 98% range.

It is a further object of this invention to provide a novel hygrometer which is capable of measuring both absolute and relative humidity.

It is a still further object of this invention to provide a novel hygrometer which is not subject to the stratum displacement disadvantage of the prior art.

It is still another object of this invention to provide a novel hygrometer wherein the electrolyte portion of the sensing element is protected against external influences.

It is still another object of this invention to provide a novel hygrometer having high time-constancy.

Other and additional objects of this invention will become apparent from a consideration of this entire specification, including the drawing and claims hereof.

In accordance with and fulfilling these objects, one aspect of this invention resides in a sensing element adapted to use in a hygrometer comprising a substrate having a rough, pitted surface; a hygroscopic electrolyte coated on the walls of said pits; a capillary containing coating on the surface of said substrate substantially bridging said pits; and at least two spaced electrode means on the surface of said substrate in contact with said electrolyte therebetween.

According to another aspect of this invention, the sensing element described above is incorporated in a hygrometer probe containing electrical leads attached to each electrode respectively and operatively associated with a meter calibrated to read directly in humidity terms. The probe may have a negative temperature coefficient semiconductor device therein which is connected in series arrangement with the electrodes. This NTC semiconductor device performs a temperature compensating function in the circuit so as to provide for absolute measurement of the moisture content irrespective of temperature. The probe is preferably equipped with switching means through which it is possible to maintain the NTC device in or out of the circuit. When this device is out of the circuit, the device functions as a relative humidity measuring hygrometer. When it is in the circuit, the device functions as an absolute humidity measuring hygrometer.

The hygrometer probe of this invention suitably comprises a housing for the sensing element which is permeable at least to water vapor, is preferably corrosion resistant and is strong enough to withstand both thermal and mechanical shock to therefore protect the sensing element. It may be practical to provide a double housing about the sensing element in order to insure such protection. One exemplary housing material is stainless steel mesh.

The sensing element substrate is suitably substantially non-conductive and may be made of substantially any such material which is inert to the electrode material, the capillary layer material, the electrolyte material, water and the water carrier under the conditions of use. It has been found that glass, quartz, ceramic and other similar materials are excellently suited to use in this invention. Polymeric materials may also be used where desired.

The capillary layer is suitably a crystalline material which is deposited on the substrate in such manner as to bridge the pits or gaps in the substrate surface. It has been found that the following materials make excellent capillary layers for use in this invention: a mixture of $CaSO_4 \cdot \frac{1}{2}H_2O$ and Seignette's salt (pottassium sodium tartrate). The capillary layer suitably has a thickness of about 0.1 to 0.4 mm.

The electrolyte is provided on the walls of the gaps or pits of the substrate surface. Such electrolyte is preferably a solid or gel material which is hygroscopic and has a conductivity which is related to its moisture content.

Exemplary of such electrolyte materials are: a mixture of lithium chloride and silver nitrate.

It may be practical to completely coat the substrate surface with electrolyte material and then remove that portion thereof adhering to the non-pit or gap portions of such surface. The electrolyte deposition may be by solution evaporation or precipitation techniques, or by other solid deposition means as desired.

The electrodes may be substantially any conductive material which does not exhibit galvanic action in the system and is otherwise inert with respect to the other components thereof. Suitably, a multiplicity of electrode members may be employed with half attached to one terminal, and the other half attached to the other terminal. These electrodes are on the substrate surface and separated by the capillary material, but in contact with the electrolyte material. Suitable electrode materials include gold, silver, platinum, palladium, stainless steel, graphite and other materials which are not subject to corrosion in the presence of water. Electrical connection of the electrodes to the terminals may be made through conventional means, as for example, gold bridges, etc.

Where used, the transducer referred to above is a conventional semi-conductor element having negative temperature co-efficient properties. These materials are available in commerce and are exemplified by spinells having doping materials included therein such as zinc titanate, magnesium chromate and the like. The semiconductor should have a temperature coefficient of about 3 to 6 percent per degree centigrade.

The sensing element of the invention is able to avoid the disadvantages of the prior art since the extraordinary hygroscopicity of the crystal acts contrary to the water vapor partial pressure. In this manner, a stable hygroscopicity of from 2 to 98% relative humidity is achieved. Another advantage which is achieved by the present invention is that the capillary system of the crystal, which stores the water absorbed from the air or from the material compensation moisture, thereby prevents any undesired stratum displacement. A further advantage of the invention is that the substance adhering to the crater walls in order to form the electrolyte is protected against external influences, and thus the desired high time-constancy is achieved.

By the use of the very fine capillary system of the invention, the adhesion of the capillaries overcomes the water vapor pressure in this low range, thereby achieving the advantage that the range of measurement is extended down from 10% to 2% relative humidity.

The sensing element of the invention can be manufactured with great accuracy even in mass production. If desired, the size of the sensing element can be so reduced that the temperature exchange of the support remains approximately equal to the indicating time, i.e., the humidity is measured in a fraction of a second and can be read on a scale. This mode of measurement is particularly advantageous whenever variations in humidity have to be recorded in rapid succession as, for example, in meteorology.

Figures 2, 3, 4, 5:
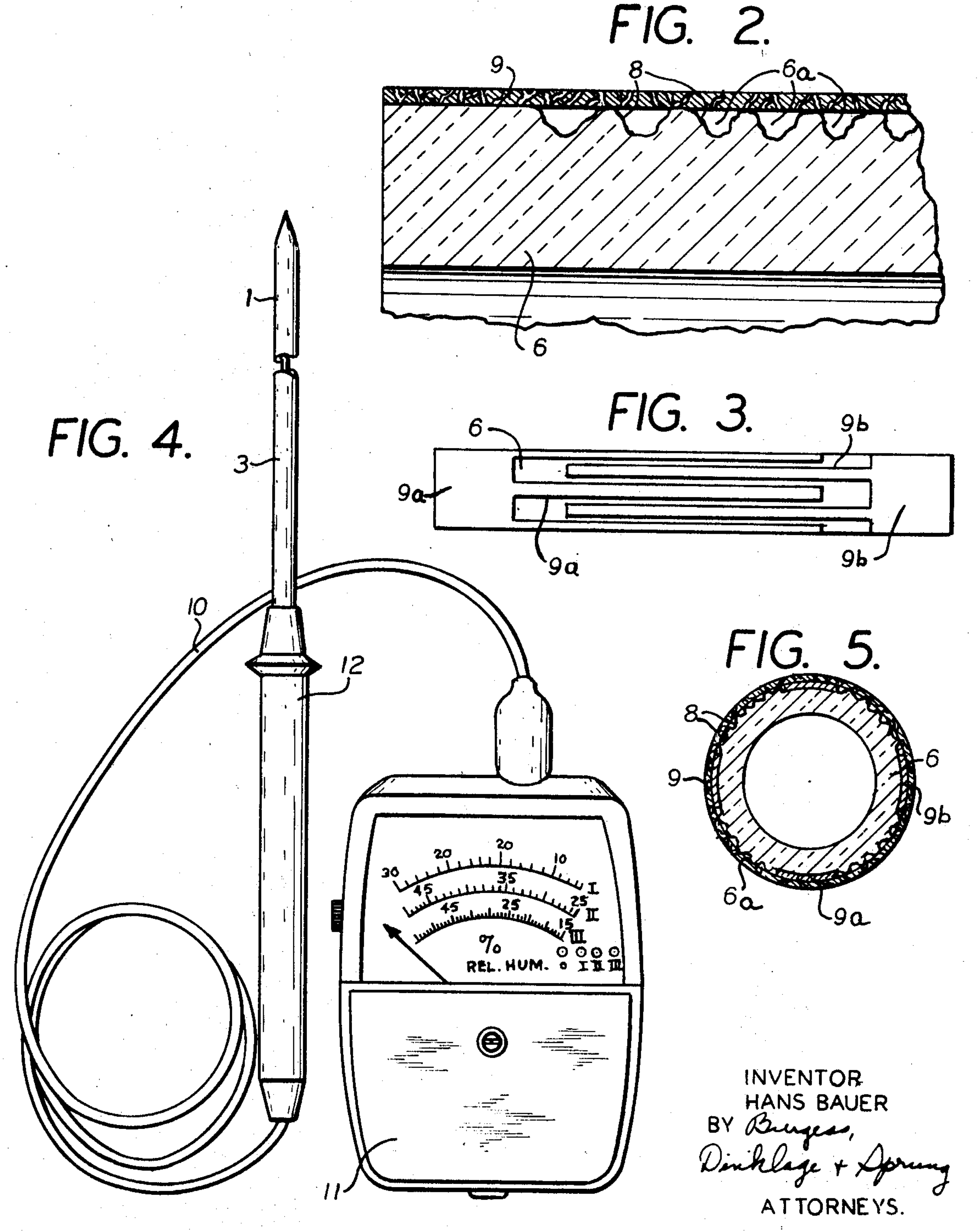

Understanding of this invention will be facilitated by reference to the accompanying drawings in which:

FIG. 1 is an elevation, partially in section, of a hygrometer probe according to this invention; FIG. 2 is an enlarged sectional view of the sensing element of this invention; FIG. 3 is an unfolded view of the electrode structure; FIG. 4 is a perspective view of a hygrometer according to this invention; and FIG. 5 is a greatly enlarged sectional end view of a round cross section hygrometer probe according to this invention.

Referring now to these drawings and particularly to FIG. 1 thereof, the sensing element according to the invention consists of an external cylindrical casing 1 whose walls consist in part of a replaceable, humidity-admitting high-grade steel filter 2, a probe tube 3 which leads to a balancing apparatus, an inner casing 4 whose walls consist, at least in part, of a humidity-admitting steel filter, a gold-plated screw 5 being disposed on the end of the inner casing as a ground electrode, a glass tube 6 which serves as the support of the so-called hygrometer probe, and a semi-conductor element 7 which serves for the temperature compensation of the electrolyte. The reference numbers 13*a* and 13*b* indicate preferably gold-plated terminal caps for the electrode system on the glass support, so as to assure a corrosion-resistant contact.

The casing 1 bearing the steel filter 2 consists of an electrically insulating material, preferably polytetrafluoroethylene, polychlorotrifluoroethylene, polyethylene or the like.

FIG. 2 represents the heart of the hygrometer sensing element of the invention; it consists of the glass tube substrate 6 whose surface is made so rough that a crater or pit system 6*a* is present. The crater walls are coated with the electrolyte substance, which is, for example, a mixture of lithium chloride and silver nitrate in a ratio of 1:9. This electrolyte coating is designated by the reference number 8. A crystal coating 9, preferably about 0.1 mm. thick, is disposed over the crater system 6*a*, and consists, for example, of a mixture of $CaSO_4 \cdot \frac{1}{2}H_2O$ and Seignette salt. This crystal coating has capillary properties.

The glass tube 6, which is appropriately referred to as the support of the hygrometer probe, has, in the manner represented in FIG. 3, for example, two surface electrodes 9*a* and 9*b* which, as shown in FIG. 3, can be interlaced with one another. The electrodes shown in FIG. 3 represent an unfolded view of the electrode structure. This structure would be wrapped around the glass tube 6 and this figure shows the complete periphery of the electrodes unfolded into a flat plane. These surface electrodes consist of a very thin coating of gold on the glass support. The electrolytic conduction processes take place between these electrodes, being more or less intense according to the degree of the humidity, and their electrical determination affords a numerical value for the ambient humidity.

Since the humidity measurement performed with the apparatus of the invention on the basis of the principle of the variation of the electrical conductivity of electrolytes depends not only on the humidity, but also on the temperature, the semi-conductor element 7 is disposed in the glass tube 6 and serves for the temperature compensation of the electrolyte. This compensation, which is of great importance for the measurement of the humidity, is performed by means of a so-called NTC resistor, i.e., one with a negative temperature co-efficient (=NTC semiconductor).

Relative humidity is a function of temperature, i.e., in an enclosed area in which a certain amount of moisture is contained in the air, the relative humidity rises as the temperature falls. This increases the electrolytic conductivity of the electrolytic substance in the sensing element. Since, in the embodiment in FIG. 1, the NTC resistor is connected in series with the electrolytic substance and the electrical conductivity in this resistor increases as the temperature increases, the desired compensation is provided, i.e., as the temperature decreases in the ambient atmosphere containing the moisture, the conductivity of the electrolytic substance increases, but the conductivity of the NTC resistor decreases. By a counterbalancing of these two phenomena as is known in the prior art, the desired quantitative compensation can be achieved. If the NTC resistor is in the circuit, the sensing element according to the invention precisely measures the absolute humidity at any temperature, since variations in the conductivity of the electrolytic substance with temperature have been compensated.

If, however, the relative humidity has to be measured, the NTC resistor is cut out, since the temperature-dependence of the electrolytic substance must be included in the reading.

The sensing element according to the invention can be in two forms. According to one embodiment adapted for the determination of the relative humidity, the NTC semi-conductor serves solely for the compensation of the temperature co-efficient of the electrolytic substance. According to another embodiment for the determination of the absolute humidity, the NTC semi-conductor is also used additionally to neutralize the effect of temperature on the relative humidity.

Both embodiments can be present together in a single hygrometer, switching over being done in any conventional manner.

The sensing element with the probe tube 3 is connected to the electrical measuring apparatus 11 by means of the cable 10. 12 designates a handle.

The sensing element of the invention is preferably operated by alternating current; it also operates, however, on direct current.

The greater the conducting areas of the electrodes (the electrodes are preferably gold electrodes 9*a* and 9*b*), the greater is the desired effect.

The supporting body 6 consists preferably of a glass tube, although it can also consist of a ceramic body or a plastic body having a surface of the same nature shown in FIG. 2.

The glass body 6 is preferably hollow, since this reduces the mass for the purpose of more rapid adjustment to temperature and more rapid temperature compensation and further provides a place inside of the glass body for the NTC semi-conductor for the temperature compensation.

The electrolytic substance itself sticks firmly to the walls of the crater system 6*a* as a result of adhesion.

As a result of the arrangement of the semi-conductor 7 as a compensation resistor in the range of measurement, i.e., in the range of humidity detection, it is possible to provide a selector switch on the measuring apparatus 11 for the selection of relative or absolute humidity readings. This switch connects the semi-conductor in the manner of a resistance-measuring bridge which simultaneously includes the resistance of the sensing element. The resistance-measuring bridge is connected in a conventional manner to an electrical circuit which converts the changes in the balance of the bridge into readings on the scale of a meter.

The embodiment of the sensing element of the invention which is represented in FIG. 1 serves mainly for the measurement of humidity of gases, such as air. For the measurement of moisture in materials, however, the sensing element can be modified accordingly without thereby departing from the framework of the invention. For example, a sharp-tipped probe form is shown in FIG. 4, which is very well suited for the measurement of the moisture in granular and powdered substances. For the measurement of surface moisture, as, for example, material compensation moisture, a probe with a large contact area can be selected, thereby improving the measuring effect.

What is claimed is:

1. A hygrometer sensing element comprising a substantially non-conductive substrate having a rough pitted surface; a hygroscopic electrolyte on the walls of said pits; a substantially non-conductive capillary-containing coating on said substrate substantially bridging said pits; and at least two spaced electrodes on said substrate surface in electrical contact with said electrolyte separated from each other by said capillary coating.

2. An element as claimed in claim 1 including a multiplicity of electrode members, half of which are connected to one terminal, and the other half of which are connected to the other terminal.

3. An element as claimed in claim 1 wherein said substrate is a substantially hollow cylinder having its outside circumference in a rough, pitted condition.

4. An element as claimed in claim 1, including a negative temperature co-efficient semi-conductor device in disconnectible series electric connection with said electrodes.

5. An element as claimed in claim 1, including a source of electric power connected with said electrodes.

6. An element as claimed in claim 1 wherein said substrate is at least one member of the group consisting of glass, quartz, ceramic and polymeric materials.

7. An element as claimed in claim 1 wherein said electrolyte is a mixture of lithium chloride and silver nitrate.

8. An element as claimed in claim 7 wherein said electrolyte constituent weight proportions are 1 to 9 respectively.

9. An element as claimed in claim 1 wherein said capillary coating is a mixture of calcium sulfate, half hydrate and Seignette's salt.

10. An element as claimed in claim 1 wherein said electrodes comprise gold.

11. A hygrometer having a steel mesh housing, a sensing element as claimed in claim 1 therein and meter means electrically connected to said sensing element.

References Cited

UNITED STATES PATENTS

| | | | |
|---|---|---|---|
| 2,756,295 | 7/1956 | Schluchter | 73—336.5 |
| 2,834,201 | 5/1958 | Ohlheiser | 338—35 |
| 3,077,774 | 2/1963 | McIlvaine | 73—336.5 |
| 3,105,214 | 9/1963 | Blythe | 73—336.5 |

LOUIS R. PRINCE, Primary Examiner

D. E. CORR, Assistant Examiner

U.S. Cl. X.R.

338—35